May 13, 1969  J. A. BASKWELL  3,444,016
SHEATHING OF ELECTRIC CABLES
Filed Sept. 9, 1963    Sheet 1 of 3
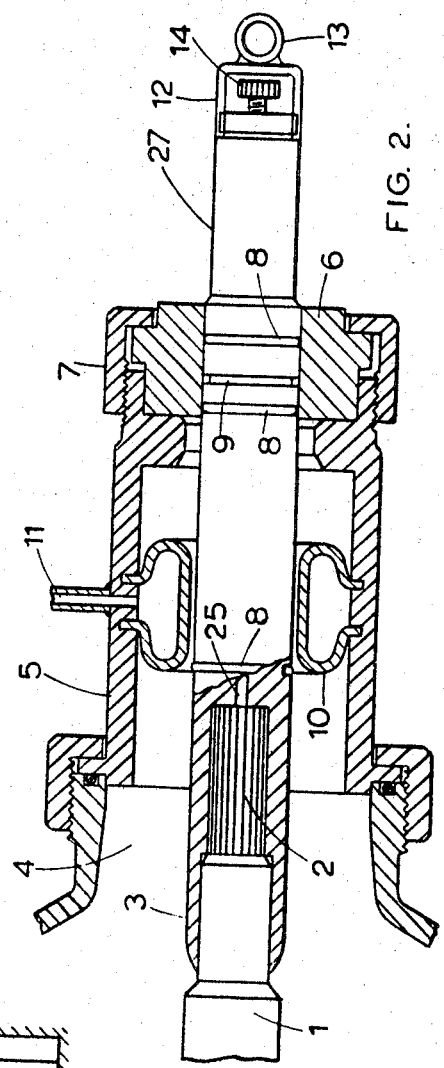
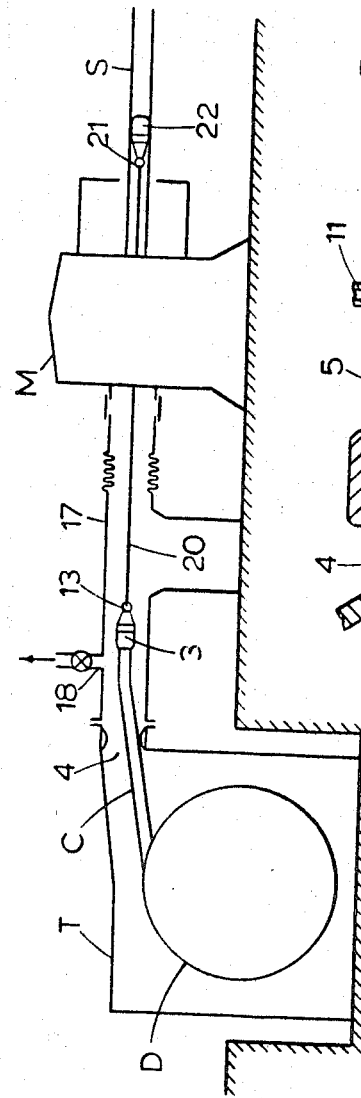
JOHN ALFRED BASKWELL

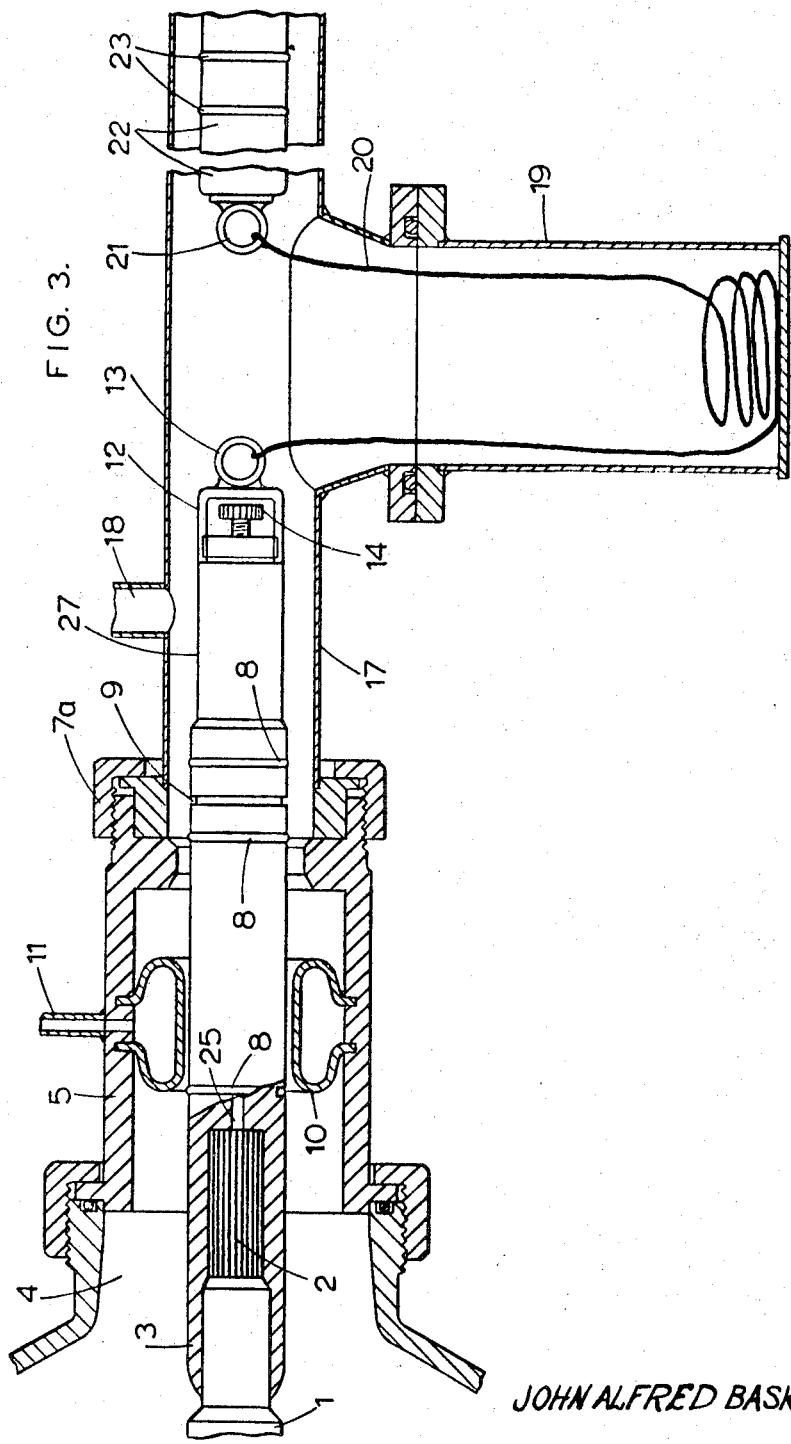

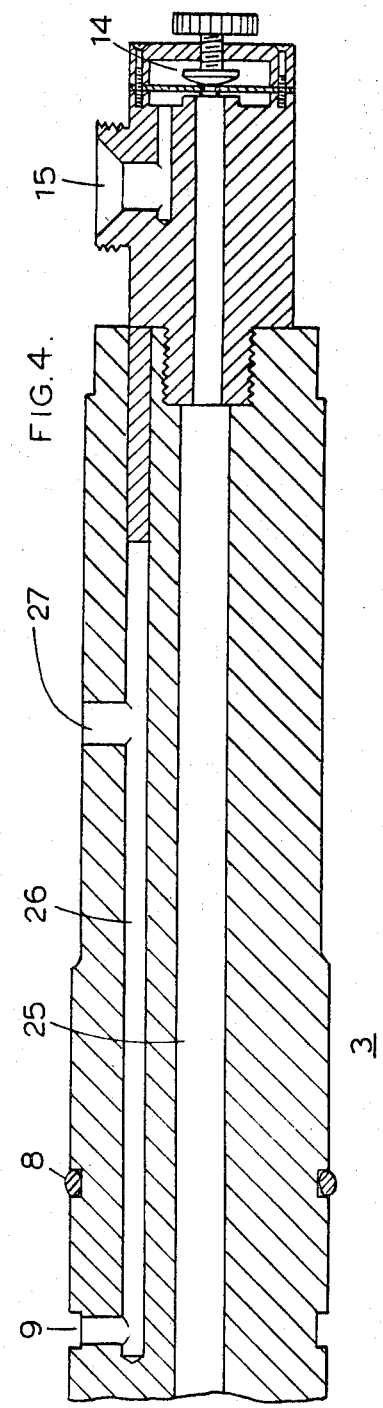

United States Patent Office 3,444,016
Patented May 13, 1969

3,444,016
SHEATHING OF ELECTRIC CABLES
John Alfred Baskwell, St. Cross, Winchester, Hants, England, assignor to Pirelli General Cable Works Limited, London, England, a British company
Filed Sept. 9, 1963, Ser. No. 307,486
Claims priority, application Great Britain, Sept. 19, 1962, 35,658/62
Int. Cl. H01b 13/06, 13/22, 17/34
U.S. Cl. 156—48                    3 Claims

ABSTRACT OF THE DISCLOSURE

Process for producing sheathed oil-filled electric cables by attaching plugs to both ends of a cable core, inserting the cable core in a tank to effect drying thereof under vacuum, passing the dried cable from the tank through an evacuated tube and a sheathing machine and extruding a sheath around the core while maintaining the core under vacuum. The sheathed core is then filled with oil through the plug.

---

The present invention relates to the sheathing of electric cables of the type in which the insulation is impregnated with an oil or other fluid, normally referred to as oil-filled cables.

Prior to impregnation, the cable must be subjected to a drying operation and this is normally performed under vacuum in a heated tank. According to British patent specification No. 827,410, one mode of procedure consists in impregnating the cable while it is still in this tank and prior to sheathing, hereinafter referred to as mass-impregnation; in another mode of procedure it may be vacuum dried, then sheathed, and finally impregnated, designated hereinafter as post-impregnation.

If the cable be mass-impregnated, it is advantageous to prevent air entering the cable or making contact with the impregnating fluid therein during transfer from the tank to the sheathing apparatus or the preformed sheath as the case may be. If post-impregnation be adopted, after sheathing, the cable must be re-evacuated in order that impregnation may be carried out, but this involves an additional process step.

The present invention is applicable to either mode of procedure and has for its object to avoid the above access of air or the necessity for the second evacuation as the case may be by enabling the cable, during its transfer from the tank to its sheath, to be maintained immersed in the impregnating fluid (hereinafter referred to as oil) if mass-impregnated or under vacuum if post-impregnated.

For this purpose, the vacuum-drying tank is connected with the sheathing apparatus or with a preformed sheath, as the case may be, by a pipe adapted to be filled with oil or evacuated as required respectively for mass- or for post-impregnation. A plug, referred to below as the first plug, having packing to make contact with the inside of the sheath, attached to the leading end of the cable while still in the tank, is connected by a chain or the like to a similar plug, designated the second plug, adapted to be drawn through the sheath by such means as a winch or by the tension exerted by the sheathing machine via the sheath; the cable is thus drawn from the drying tank into the sheath as described below, whether the latter be produced in situ or preformed. In any case the cable remains immersed in oil or under vacuum as required.

During treatment of the cable in the vacuum-drying tank, the first plug projects through a fitting, suitably of cylindrical form, secured over an aperture in the tank wall so as to constitute the tank mouth: for this purpose, a packing element, such as a collar clamped to the end of the fitting, makes fluidtight contact with the plug. This fitting likewise serves for connection to the tank of the above pipe leading to the sheathing apparatus or sheath and, for this purpose, the packing element must be removed: hence the fitting is also provided with a device, such as one or more inflatable seals, which operates to seal the plug within the fitting after removal of the packing element and during attachment of the pipe to the fitting. When this has been effected and the pipe, through a suitable aperture, filled with oil or evacuated, as the case may be, the sealing device may be released. Use of an inflatable seal has the advantage that there is no danger of it causing damage to the cable core during the subsequent working steps, since upon deflation and release it is no longer in contact with the core.

Travel of the cable through this pipe is then initiated by operation of the above-mentioned winch or the like on the second plug, traction being transmitted from the latter to the first plug by the connecting chain. The second plug enters the sheathing apparatus and makes fluidtight contact with the sheath and time must then be allowed for filling the connecting pipe with oil or establishing a vacuum therein, according to requirements, while permitting travel of the second plug within the sheath to continue: this is achieved by a chain of appropriate length so that the required interval of time occurs between start of movement of the second plug and that the first plug and of the cable attached to it. For the accommodation of the slack of the chain until it becomes taut between the plugs, there is provided a recess or box which opens into the connecting pipe and partakes of the oil filling or evacuation to which the latter is alternatively subjected. As the first plug enters the sheath it makes fluidtight contact therewith and therefore takes over from the second plug the function of sealing the connecting pipe and the drying tank and the second plug may then be removed. The trailing end of the cable is sealed by a plug similar to the first plug.

In dealing with a mass-impregnated cable, means must be provided for compensating for volume changes of the oil due to temperature variation: conversely, in the case of post-impregnation, provision must be made to eliminate possible air leakage past the first plug and to permit impregnation after the sheathing operation. To these ends, the plug is provided with means permitting a connection to be made to the cable interior, for example, there is fitted in the first plug a manually adjustable valve controlling passages in the plug leading from an aperture in its periphery to which appropriate connections may be made.

In post-impregnation, to maintain fluidtightness between the first plug and the sheath, there may be provided two or more packing rings and between them a groove and a passageway in the plug leading forwardly from the groove to another peripheral aperture to which appropriate vacuum connection may be made so that any air leaking past either packing ring is removed. This action may also be taken while the first plug is located within the fitting applied to an aperture in the drying tank wall. Subsequently, when the cable has been sheathed, the first aperture may be connected to a source of impregnating oil and the valve adjusted to allow flow of the latter through a passage giving access to the cable insulation.

In dealing with a mass-impregnated cable, the peripheral aperture in the first plug may be connected to a pressurised oil reservoir, the valve being adjusted to open the passage giving access to the cable insulation: thus the required compensating effect is afforded.

The construction of the plug sealing the leading end of the cable therefore constitutes an important feature of the present invention. In a post-impregnation process it serves the dual function of both acting as a vacuum seal for the sheathed and initially evacuated cable and as a means whereby the impregnating oil can be subsequently fed into the cable without the necessity of further intermediate evacuating steps.

In the case of a preformed sheath the technique is somewhat different since it is not possible to draw the cable through a tightly fitting sheath by reason of the friction which would be set up. Instead the sheath requires initially to be a loose fit and is then drawn down in diameter around the cable. In order to enable this to be carried out one end of the preformed sheath can be connected to the mouth of the tank whilst the other end may include a sliding vacuum or oil seal through which a hawser pulling the cable can be drawn, in order that vacuum or oil may be maintained within the sheath, as the case may be depending on whether a post- or mass-impregnation process is being carried out, during introduction of the cable and the drawing down of the sheath. The connecting tube and second plug are unnecessary in this instance.

In order that the present invention may be more clearly understood reference will now be made to the accompanying drawings, in which:

FIGURE 1 represents in block schematic form a view of the whole apparatus;

FIGURE 2 represents a view, principally in cross-section, of the mouth of the tank with the first plug and leading end of the cable positioned therein;

FIGURE 3 represents a view, principally in cross-section, of the apparatus of FIGURE 2 but at a later stage in the method once the connecting tube and second plug and connecting chain have been incorporated; and FIGURE 4 represents an axial cross-section through the first plug.

As shown in diagrammatic form in FIGURE 1, the apparatus for both mass-impregnation and post-impregnation, when the sheath is to be formed continuously instead of being preformed, comprises a tank T containing a cable C to be sheathed wound on a drum D mounted in the tank. A sheath S is continuously formed about the cable C by a sheathing machine M and the cable is drawn from the tank T to the machine through a connecting tube or pipe 17.

Referring now to FIGURE 2, the leading end of the cable C, which has insulation 1 and a central conductor 2, is secured to a first plug 3. The wall of the impregnating and/or drying tank T is formed with an aperture 4 around which is secured a cylindrical fitting 5 so as to constitute jointly with the aperture a mouth for the tank. The plug 3 is secured to the fitting by a collar 6 constituting a packing element and an outer clamping sleeve 7, and includes O-rings 8 of resilient material and a peripheral groove 9 located between them. An inflatable seal comprising a tube 10 of resilient material to which fluid, for example, air can be supplied by pipe 11 is provided in the fitting 5 to the rear of the collar 6 and clamp 7. Alternatively, two such seals may be used with a vacuum guard between them.

To the free end of the plug 3 there is fixed a shackle 12 and ring 13 whereby a pulling chain 20 can be connected to the plug, as will be explained in detail later.

FIGURE 4 shows the inner structure of the plug 3, the shackle 12 and ring 13 being omitted from this view. A passage 26 leads from the groove 9 to an aperture 27 so that any air leaking past O-rings 8 into the groove can be removed by having aperture 27 connected to a vacuum source through a connecting tube 16 as shown in FIGURE 2. For use particularly in the post-impregnation method, the plug 3 is also fitted with a manually adjustable vacuum valve 14 controlling a central passage 25 within the plug leading from aperture 15 in the plug periphery to the interior of the cable. Oil pressure or vacuum can be applied to aperture 15.

In FIG. 3, collar 6 and clamping sleeve 7 have been removed and the flanged end of connecting tube 17 has been inserted in the end of fitting 5 and secured thereto by clamping sleeve 7a, the other end of the tube being united in fluidtight manner to the core die of a lead extrusion press constituting the sheathing machine M. The latter is not shown in detail since it is of entirely conventional construction and the mode of making the fluidtight connection will be clear to those skilled in the art. Thus, one suitable mode of connection is to unite tube 17 to another tube carrying the core die itself within the press by means of an intermediate pipe section connected at its ends to the tube 17 and core tube by means of slidable fluidtight sleeve connections.

Tube 17 includes an aperture 18 through which a vacuum can be created in the tube by connection to an appropriate suction source. The underside of the tube is also formed with a recess 19 constituting a chain-box for reception of the slack of the chain 20 linking ring 13 at the front of the first plug 3 and ring 21 at the rear of the second plug 22.

Plug 22 includes O-rings 23 analogous to those on the first plug 3 in order to be able to form eventually a hermetic seal with the cable sheath.

In carrying out a post-impregnation method according to the present invention with the apparatus of FIGURES 1, 2, 3 and 4 the plug 3 is secured to the leading end of the cable C and positioned in the mouth of the tank T by the collar 6 and clamp 7, the tank then being evacuated. Air is then pumped in via pipe 11 so as to inflate seal 10 and enable it to provide a fluidtight connection around the cable. Clamp 7 is then removed, collar 6 substituted by the flanged end of tube 17 which is connected to the core die and clamp 7a put in place.

Plug 22 is then sealingly inserted by means of a draw-wire (not shown) into an initial portion of sheath S already formed by the extrusion press M; vacuum is then applied to aperture 18 and the valve opened. Operation of the press is then continued so that the plug 22 is advanced and takes up the slack of chain 20. Simultaneously tube 17 is being evacuated through aperture 18 so that by the time the chain 20 becomes taut and the forward tractive effort exerted by the progressively formed sheath S commences to be transmitted to the first plug 3 and the cable C, the tube is devoid of air. At this time the seal 10 is also deflated to release the plug 3 and effect communication between the evacuated tank T and the evacuated tube 17. The cable then progressively travels through the tube 17 in the same vacuum environment as in the tank up to and through the extrusion press where sheath S is continuously formed around it.

The trailing end of the cable C is provided with a suitable end-plug with which the sheath can form a seal. The sheathing operation is thus completed when this end-plug, after having been drawn from drum D through tube 17, emerges from the sheathing machine M with the sheath S sealed about it. The sheath can be cut off after the end-plug and since the O-rings 8 of the first plug 3 form a hermetic seal with the sheath S, the sheath can also be cut in the zone between the plugs 3 and 22 so as to remove the chain 20 and recover plug 22.

The process thus far provides an evacuated system comprising the sheathed electric cable, the plug 3 and the end-plug to which the ends of the cable are respectively sealed. The sheath is cut at the plug 3 so as to provide access to the aperture 15 through which the cable can be filled with oil when desired after opening the valve 14.

In carrying out a mass-impregnation method according to the invention with the apparatus of FIGURES 1, 2, 3 and 4, the steps previously described are performed up to the insertion of the plug 22 into an initial portion of the sheath S formed at the extrusion press.

Operation of the press is then continued, also as before, so that the plug 22 is advanced to take up the slack of chain 20; however, tube 17 after evacuation is in this case simultaneously filled with oil, so that by the time the chain 20 becomes taut and the forward tractive effort exerted by the progressively formed sheath begins to be transmitted to the first plug 3 and the cable, the tube is oil-filled and devoid of air. The seal 10 is then deflated. The tank T has also been filled with oil at any convenient previous time after its evacuation, so that deflation of seal 10 releases the plug 3 and establishes communication between the oil-filled tank and the oil-filled tube 17. The cable then progressively travels through the tube in the same oil-filled environment as in the tank up to and through the extrusion press where sheath is continuously formed around it.

The trailing end of the cable C has again been provided with a suitable end-plug to which the sheath will seal. When this has emerged from the press M and the sheath cut as before, an oil-filled cable, its ends sealed by the plug 3 and the end-plug is obtained. Oil under pressure can be applied to the cable through aperture 14, valve 15 and passageway 25 to compensate for changes in the volume of oil due to temperature variation.

In the method of the invention using a preformed sheath, the connecting tube 17, the second plug 22 and of course the sheathing machine M will not be required. The cable C, provided with the first plug 3 and an end-plug, is however dried in the evacuating tank T on drum D as before, with the plug 3 clamped by the packing-ring 6 to close the tank. In the post-impregnation method, the seal 10 is inflated when drying is complete and the clamping sleeve 7 is removed. Instead of then clamping the connecting tube 17 to the fitting, one end of a preformed sheath of appropriate length is secured thereto. The preformed sheath, usually aluminium tubing, has previously been unwound from a storage drum and a hawser passed along its entire length, for example, by application of air pressure to one end of the sheath to blow there along a piston member having one end of the hawser attached thereto. Before the one sheath end is clamped to the fitting 5, the adjacent hawser end is secured to ring 13 of plug 3; the other hawser end is slidingly received in sealing means at the associated end of the sheath. The sheath is next evacuated. This may be done by application of a source of vacuum to a valved aperture provided in the sealing means or alternatively an intermediate pipe with a side tube for connection to the vacuum source can be interposed between the fitting 5 and the sheath end.

The sheath having been evacuated, resilient seal 10 is released and the cable can be drawn into the preformed sheath by means of a winch or the like drawing the hawser through the sealing means at the other end of the sheath. A corrugating die or roller around the sheath is then used in order to reduce the effective internal diameter of the sheath to fit the cable core. The plug 3 and the end plug fit loosely within the preformed sheath before it is contracted on to the cable, but the action of the die or roller seals the sheath about these plugs so that the product of the process is as before an evacuated system comprising a sheathed cable having a plug at each end to which the sheath ends are sealed. Impregnation of the cable can be effected at any desired subsequent time in the manner previously described.

The steps of the mass-impregnation method using a preformed sheath are similar but before the inflatable seal 10 is released, both the tank T and the uncontracted sheath are filled with oil in place of the vacuum produced as described above. The sheath is drawn down as described and the product is an impregnated sheathed cable having its ends sealed by the plug 3 and the end-plug.

In a modification of the present apparatus, the first plug may be provided with an additional peripheral groove between guard-ring 9 and rear O-ring 8 for reception of pawls pivoted to the mouth of the tank, to enable the plug to be held firmly in position during initial assembly of the apparatus. Other forms of valve means and internal passageways for the first plug whereby the sheathed cable can be filled or topped-up with impregnating oil may of course be employed in place of the diaphragm-type valve and longitudinal passageway illustrated. The same type of plug can be used for plugs 3 and 22 and for the end-plug. However, only one of plugs 3 and the end-plug need have the pass passageway through which oil can be introduced.

Whilst the application of the present invention to both mass- and post-impregnation of the cable has been described, it is of especial value in effecting post-impregnation. The ability to fill the cable subsequently, at any suitable time, with oil represents a substantial advantage since it enables the capital investment in the oil plant to be considerably reduced.

What I claim and desire to secure by Letters Patent of the United States is:

1. A method of manufacturing a sheathed oil-filled electric cable comprising:
    attaching plugs to both ends of a cable core;
    subjecting said core having plugs to a vacuum;
    drying said core having plugs;
    passing said dried core having plugs through a sheathing means while maintaining said vacuum;
    extruding a sheath around said core as said core under vacuum is passed through said sheathing means; and
    filling the evacuated core with oil through one of said plugs.

2. A method of manufacturing a sheathed oil-filled electric cable comprising:
    attaching a plug to one end of a cable core;
    positioning said cable core with plug in a tank;
    evacuating said tank;
    passing said cable core, plug end first, through an evacuated tube between said tank and a sheathing means;
    passing said cable core through said sheathing means;
    extruding a sheath around said cable core as said cable core is passed through said sheathing means while maintaining vacuum around said cable core; and
    subsequently filling the evacuated sheathed core with oil through said plug.

3. A method of manufacturing a sheathed oil-filled electric cable comprising:
    attaching a plug to one end of a cable core;
    positioning the cable core having the plug in a first vacuum environment;
    inflating a seal to provide a fluid tight connection around the cable core;
    drying said core;
    establishing a second vacuum environment, said first and second vacuum environments being separated by said inflated seal;
    deflating the seal to place the first and second vacuum environments in fluid flow communication;
    passing the dried core from the first vacuum environment through the second vacuum environment and through a sheathing means;
    extruding a sheath around said core as it is passed through said sheathing means while maintaining said core subject to vacuum; and
    subsequent to the extruding steps, filling the evacuated sheathed core with oil through said plug.

References Cited

UNITED STATES PATENTS

| | | | |
|---|---|---|---|
| 1,872,818 | 8/1932 | Roper | 174—10 |
| 1,973,111 | 9/1934 | Schlecker | 174—10 |
| 2,708,176 | 5/1955 | Rhodes | 156—48 |
| 2,781,285 | 2/1957 | White et al. | 156—48 |
| 3,013,912 | 12/1961 | Priaroggia et al. | 156—51 |
| 3,032,464 | 5/1962 | Grieve | 156—51 |
| 3,238,757 | 3/1966 | Eilenberg et al. | 156—51 |

EARL M. BERGERT, *Primary Examiner.*

T. R. SAVOIE, *Assistant Examiner.*

U.S. Cl. X.R.

156—51, 174—24